United States Patent
Kang et al.

(10) Patent No.: US 10,095,277 B2
(45) Date of Patent: Oct. 9, 2018

(54) ELECTRONIC APPARATUS AND DISPLAY CONTROL METHOD THEREOF (71) Applicant: Lenovo (Beijing) Co., Ltd., Beijing (CN)

(72) Inventors: Kai Kang, Beijing (CN); Xu Jia, Beijing (CN)

(73) Assignee: LENOVO (BEIJING) CO., LTD., Haidian District, Beijing (CN)

(*) Notice: Subject to any disclaimer, the term of this patent is extended or adjusted under 35 U.S.C. 154(b) by 55 days.

(21) Appl. No.: 14/585,510

(22) Filed: Dec. 30, 2014

(65) Prior Publication Data
US 2015/0370341 A1   Dec. 24, 2015

(30) Foreign Application Priority Data

Jun. 24, 2014 (CN) .......................... 2014 1 0288911

(51) Int. Cl.
G06F 3/033   (2013.01)
G06F 1/16    (2006.01)
(Continued)

(52) U.S. Cl.
CPC .......... G06F 1/1694 (2013.01); G06F 3/0227 (2013.01); *G06F 3/0346* (2013.01); *G06F 3/0487* (2013.01); *G06F 2203/04803* (2013.01)

(58) Field of Classification Search
CPC .............. G06F 3/0227; G06F 3/04817; G06F 3/04842; G06F 3/04886; G06F 3/0487;
(Continued)

(56) References Cited

U.S. PATENT DOCUMENTS 5,910,802 A * 6/1999 Shields ................. G06F 3/0488
345/173
6,392,671 B1 * 5/2002 Glaser ................. G06F 3/03543
715/745

(Continued)

FOREIGN PATENT DOCUMENTS

CN   102855105   1/2013
CN   103648045   3/2014

OTHER PUBLICATIONS

First Office Action dated Aug. 11, 2016 out of Chinese priority Application No. 201410288911.9 (11 pages including English Translation).

*Primary Examiner* — Jimmy H Nguyen
(74) *Attorney, Agent, or Firm* — Brinks Gilson & Lione; John C. Freeman (57) ABSTRACT An electronic apparatus and a display control method are described. The display control method includes determining whether the external input device is connected with the electronic apparatus; controlling the display component to display the graphic user interactive interface with a first display mode in a state where the external input device is not connected with the electronic apparatus; and controlling the display component to display the graphic user interactive interface with a second display mode in a state where the external input device is connected with the electronic apparatus, wherein layout of operable objects in the graphic user interactive interface displayed with the first display mode and layout of operable objects in the graphic user interactive interface displayed with the second display mode are different.

10 Claims, 3 Drawing Sheets (51) Int. Cl.
*G06F 3/02* (2006.01)
*G06F 3/0346* (2013.01)
*G06F 3/0487* (2013.01)

(58) Field of Classification Search
CPC .... G06F 3/0484; G06F 3/0481; G06F 3/0488;
G06F 2203/04803; G06F 2203/04807
USPC .................................................. 345/156–184
See application file for complete search history.

(56) References Cited

U.S. PATENT DOCUMENTS

| | | | |
|---|---|---|---|
| 9,026,939 B2* | 5/2015 | Smus | G06F 3/038 |
| | | | 345/175 |
| 2003/0006968 A1* | 1/2003 | Solomon | G06F 1/1632 |
| | | | 345/168 |
| 2004/0066414 A1* | 4/2004 | Czerwinski | G06F 3/0481 |
| | | | 715/781 |
| 2005/0280633 A1 | 12/2005 | Glaser | |
| 2013/0257909 A1* | 10/2013 | Nagata | G09G 5/38 |
| | | | 345/650 |
| 2014/0139470 A1 | 5/2014 | Li et al. | |

* cited by examiner

Figure 4

ELECTRONIC APPARATUS AND DISPLAY CONTROL METHOD THEREOF

This application claims priority to Chinese patent application No. 201410288911.9 filed on Jun. 24, 2014, the entire contents of which are incorporated herein by reference.

BACKGROUND

The present application relates to an electronic apparatus and a display control method thereof.

An external input device such as a stylus, a keyboard, a mouse, and others may be connected in an electronic apparatus such as a mobile phone, a tablet PC, and so on. Accordingly, for example, in the need to frequently perform input operation, the user connects the external input device to the electronic apparatus so that input operation can be performed conveniently.

In the related art, the same one graphic user interactive interface is displayed in a display component, irrespective as to whether the external input device is connected to the electronic apparatus or not. Thereby, when the user connects the external input device to the electronic apparatus to perform input operation, the user is not accustomed to the same one graphic user interface as displayed, operating experience reduces.

SUMMARY

The present application is accomplished in view of the above fact, and aims to provide an electronic apparatus and a display control method thereof, which can appropriately change the graphic user interactive interface displayed in the display component according to whether the external input device is connected with the electronic apparatus, and thereby enhance the operating experience of the user.

According to an aspect of the present application, there is provided an electronic apparatus capable of being connected with an external input device, the electronic apparatus comprising: a display component configured to display a graphic user interactive interface; and a control component configured to determine whether the external input device is connected with the electronic apparatus, control the display component to display the graphic user interactive interface with a first display mode in a state where the external input device is not connected with the electronic apparatus, and control the display component to display the graphic user interactive interface with a second display mode in a state where the external input device is connected with the electronic apparatus, wherein layout of operable objects in the graphic user interactive interface displayed with the first display mode and layout of operable objects in the graphic user interactive interface displayed with the second display mode are different.

According to another aspect of the present application, there is provided a display control method in an electronic apparatus that is capable of being connected with an external input device and comprises a display component configured to display a graphic user interactive interface, the display control method comprising: determining whether the external input device is connected with the electronic apparatus; controlling the display component to display the graphic user interactive interface with a first display mode in a state where the external input device is not connected with the electronic apparatus; and controlling the display component to display the graphic user interactive interface with a second display mode in a state where the external input device is connected with the electronic apparatus, wherein layout of operable objects in the graphic user interactive interface displayed with the first display mode and layout of operable objects in the graphic user interactive interface displayed with the second display mode are different.

The electronic apparatus and the display control method thereof according to the present application can appropriately change the graphic user interactive interface displayed in the display component according to whether the external input device is connected with the electronic apparatus, and thereby enhance the operating experience of the user.

DETAILED DESCRIPTION

Hereinafter, embodiments of the present application will be explained with reference to the accompany drawings. The descriptions are provided below with reference to the accompany drawings to assist in understanding the exemplary embodiments of the present application defined by the claims thereof and their equivalents, which comprises assisting in understanding various specific details that can only be considered exemplary instead. Thus, as will be appreciated by those skilled in the art, it is possible to make various changes and modifications to the embodiments described herein without departing from the scope and spirit of the present application. Moreover, in order to make the specification more clear and more concise, detailed descriptions of well-known functions and constructions in the art will be omitted.

The electronic apparatus according to an embodiment of the present application is capable of being connected with an external input device. The electronic apparatus comprises: a display component configured to display a graphic user interactive interface; and a control component configured to determine whether the external input device is connected with the electronic apparatus, control the display component to display the graphic user interactive interface with a first display mode in a state where the external input device is not connected with the electronic apparatus, and control the display component to display the graphic user interactive interface with a second display mode in a state where the external input device is connected with the electronic apparatus, wherein layout of operable objects in the graphic user interactive interface displayed with the first display mode and layout of operable objects in the graphic user interactive interface displayed with the second display mode are different.

Herein, the electronic apparatus according to an embodiment of the present application is for example a mobile phone, a tablet computer, and so on, the external input device for example is a stylus, a keyboard, a mouse, a touchpad, and others. The aforesaid control component may be implemented through dedicated hardware circuits, or through software controlling universal hardware. A connection manner between the electronic apparatus and the external input device is unlimited, it may be a wired connection in physical contact, and may also be a wireless connection like Bluetooth, infrared, and so on.

The operable objects in the graphic user interactive interface can respond to a trigger operation of the user, thereby can achieve functions like returning to a main interface, displaying object identifications of applications that are running, enabling a specified application and so on. In the graphic user interactive interface, the operable objects are displayed for example as a functional key, an application icon (i.e., an object identification of an application), and so on.

In the electronic apparatus according to an embodiment of the present application, layout of the operable objects in the graphic user interactive interface changes based on whether the external input device is connected with the electronic apparatus, so that the graphic user interactive interface displayed in the case where the external input device is connected with the electronic apparatus is adapted to that the user performs input operation with the external input device, thereby the operating experience of the user can be enhanced.

Figure 1:
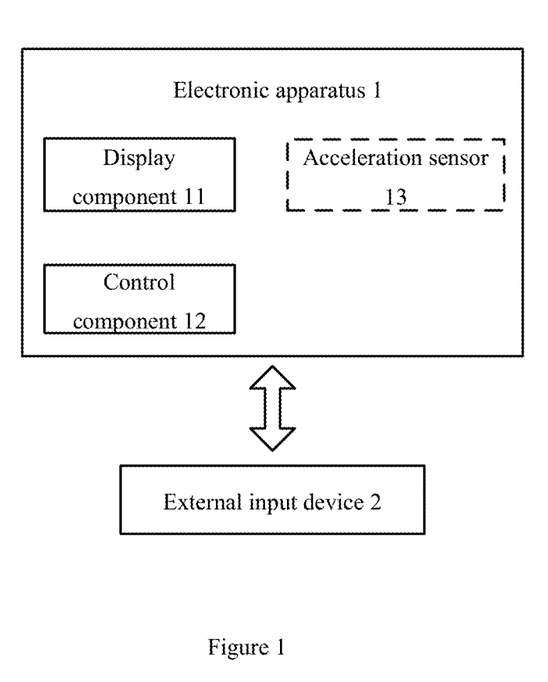
FIG. 1 is a functional block diagram showing an electronic apparatus 1 according to an embodiment of the present application.

Hereinafter, an electronic apparatus 1 according to an embodiment of the present application will be described with reference to FIG. 1. FIG. 1 is a functional block diagram showing an electronic apparatus 1 according to an embodiment of the present application. As shown in FIG. 1, the electronic apparatus 1 is capable of being connected with to an external input device 2, and comprises a display component 11 and a control component 12.

The display component 11 displays a graphic user interactive interface in which a plurality of operable objects that can execute prescribed functions in response to a trigger operation of the user are provided.

A navigation area is set in the graphic user interface, and a plurality of operable objects that can execute prescribed functions in response to a trigger operation of the user are provided within the navigation area. The operable objects within the navigation area will be described in detail below.

The control component 12 determines whether the external input device 2 is connected with the electronic apparatus 1, controls the display component 11 to display the graphic user interactive interface with a first display mode in a state where the external input device 2 is not connected with the electronic apparatus 1, and controls the display component 11 to display the graphic user interactive interface with a second display mode in a state where the external input device 2 is connected with the electronic apparatus 1, wherein layout of operable objects in the graphic user interactive interface displayed with the first display mode and layout of operable objects in the graphic user interactive interface displayed with the second display mode are different.

Specifically, in the case where the electronic apparatus 1 is powered and switched on, the control component 12 determines whether the external input device 2 is connected with the electronic apparatus 1, controls the display component 11 to display the graphic user interactive interface with a first display mode in a state where the external input device 2 is not connected with the electronic apparatus 1, and controls the display component 11 to display the graphic user interactive interface with a second display mode in a state where the external input device 2 is connected with the electronic apparatus 1. Furthermore, in the state where the control component 12 in the electronic apparatus 1 controls the display component 11 to display the graphic user interactive interface with the first display mode, if the control component 12 determines that the external input device 2 is connected with the electronic apparatus 1, a graphic user interactive interface displayed with the first display mode is switched to a graphic user interactive interface displayed with the second display mode. In contrast, in the state where the control component 12 in the electronic apparatus 1 controls the display component 11 to display the graphic user interactive interface with the second display mode, if the control component 12 determines that the external input device 2 is not connected with the electronic apparatus 1, a graphic user interactive interface displayed with the second display mode is switched to a graphic user interactive interface displayed with the first display mode.

In the case where a navigation area is set in the graphic user interactive interface, layout of operable objects within a navigation area in the graphic user interactive interface displayed with the first display mode and layout of operable objects within a navigation area in the graphic user interactive interface displayed with the second display mode are different.

By means of making layout of operable objects within the navigation area change while layout in the non-navigation area remains unchanged in the graphic user interactive interface, the sense of discomfort brought by the change of the graphic user interactive interface to the user when the external input device is connected to the electronic apparatus 1 can be reduced, meanwhile the operating experience of the user can be enhanced.

Figure 2:
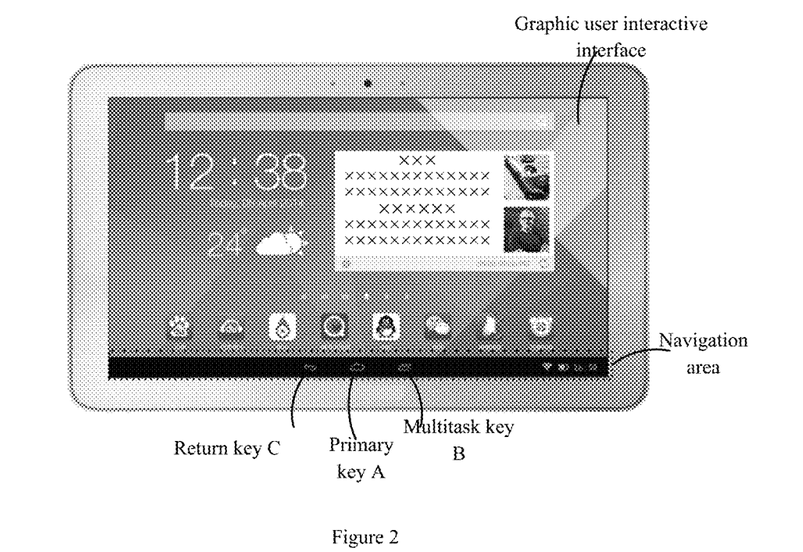
FIG. 2 is an exemplary diagram showing the graphic user interactive interface displayed with the first display mode.

FIG. 2 is an exemplary diagram showing the graphic user interactive interface displayed by the display control component 11 with the first display mode as controlled by the control component 12. As shown in FIG. 2, operable objects that can execute prescribed functions in response to a trigger operation of the user are provided within the navigation area of the graphic user interactive interface.

Specifically, a primary key A, a multitask key B, and a return key C (i.e., operable objects) are provided in the navigation area as shown in FIG. 2. In addition, for example, operable objects such as application icons and so on are provided in the non-navigation area as shown in FIG. 2. The aforesaid operable objects can respond to a trigger operation of the user, and thereby achieve specified functions. For example, if the user performs a trigger operation on the primary key A, then it is possible to return to the main display interface from any display interface, if the user performs a trigger operation on the multitask key B, then it is possible to display object identifications of the applications that are running in the electronic apparatus (e.g., the display interface of the applications that are running is displayed in a folded way), if the user performs a trigger operation on the return key C, it is possible to return to a previous display interface. Moreover, if the user performs a trigger operation on the application icons within the non-navigation area, then it is possible to enable the corresponding applications. Besides, the graphic user interactive interface displayed with the first display mode as shown in FIG. 2 is merely illustrative, numbers, locations, functions etc. of the operable objects are not within the defining scope of the present application, any numbers, locations, and functions are allowed.

Hereinafter, the manners that layout of operable objects in the graphic user interactive interface displayed with the second display mode and layout of operable objects in the graphic user interactive interface displayed with the first display mode are different will be described in detail. Next, referring to FIG. 2, examples will be provided to illustrate that layout of the operable objects within the navigation area of the graphic user interactive interface in a different display mode is different.

With respect to configuration parameters of the first display mode and configuration parameters of the second display mode which will be described below, it is possible to set initial configurations at factory delivery of the electronic apparatus 1, and it may also be reconfigured by the user based on his/her own habits relative to display. The manner of layout of the operable objects within the navigation area in the graphic user interactive interface in respective display modes can be determined based on the configuration parameters of the respective display modes.

In a first manner, when the control component 12 controls the display component 11 to display the graphic user interactive interface with the second display mode, X operable objects within the navigation area are displayed in a second area of the navigation area based on configuration parameters of the second display mode, X being a positive integer greater than or equal to one, a relative position of the second area of the navigation area relative to the display component is different from a relative position of a first area of the navigation area relative to the display component, the first area of the navigation area being a position where the X operable objects within the navigation area are displayed within the navigation area based on configuration parameters of the first display mode.

That is, in the first manner, the control component 12 shifts, based on the configuration parameters of the second display mode, the X operable objects displayed within the navigation area based on the configuration parameters of the first display mode.

For example, as shown in FIG. 2, according to the configuration parameters of the first display mode, three operable objects displayed with the first display mode within the navigation area are displayed in the middle relative to the display component 11 (corresponding to the first area) (X=3). The control component 12 can display the above three operable objects leftwards (corresponding to the second area) relative to the display component 11 based on the configuration parameters of the second display mode. That is to say, the three operable objects displayed with the second display mode are shifted relative to the three operable objects displayed with the first display mode.

In a second manner, when the control component 12 controls the display component 11 to display the graphic user interactive interface with the second display mode, M operable objects are displayed within the navigation area based on the configuration parameters of the second display mode, M being a positive integer that satisfies 1≤M<N, N being the number of operable objects displayed within the navigation area as determined based on the configuration parameters of the first display mode, the M operable objects are part of the N operable objects which are for being displayed within the navigation area as determined based on the configuration parameters of the first display mode.

That is, in the second manner, the control component 12 reduces, based on the configuration parameters of the second display mode, part of the operable objects among the X operable objects displayed based on the configuration parameters of the first display mode within the navigation area.

For example, as shown in FIG. 2, according to the configuration parameters of the first display mode, three operable objects are displayed within the navigation area displayed with the first display mode (in particular, the primary key A, the multitask key B, and the return key C) (N=3). The control component 12 can display, based on the configuration parameters of the second display mode, only the primary key A within the navigation area of the graphic user interactive interface (i.e., the multitask key B and the return key C are reduced) (M=1).

By means of removing parts of the operable objects that are not in use or used less frequently when the external input device 2 is connected with the electronic apparatus 1 in the case where the graphic user interactive interface is displayed with the second display mode, the graphic user interactive interface can be made more concise, which facilitates the user performing input operation with the external input device 2.

In a third manner, when the control component 12 controls the display component 11 to display the graphic user interactive interface with the second display mode, object identifications of K applications that are running in the electronic apparatus are obtained based on the configuration parameters of the second display mode and the K object identifications are displayed within the navigation area as operable objects, K being a positive integer greater than or equal to one, the object identifications of the K applications are used for invoking applications corresponding to the object identifications in response to a trigger operation. The aforesaid K applications are applications initiated by object identifications within the non-navigation area of the graphic user interactive interface displayed with the first display mode in response to a trigger operation. A first operable object within the navigation area of the graphic user interactive interface displayed based on the first display mode is used for displaying the object identifications of the K applications that are running in response to a trigger operation.

That is, in the first display mode, it is possible to display the object identifications of the K applications that are running in the electronic apparatus 1 by means of performing a trigger operation on the first operable object provided within the navigation area in the graphic user interactive interface. Accordingly, the user can enable a corresponding application by further performing a trigger operation on any of the displayed object identifications of the K applications. In addition, the aforesaid K applications may also be initiated by performing a trigger operation on object identifications provided within the non-navigation area of the graphic user interactive interface. On the other hand, in the second display mode, the object identifications of the K applications that are running in the electronic apparatus 1 are displayed within the navigation area of the graphic user interactive interface. Thereby, the user can enable the corresponding applications by performing a trigger operation on the object identifications of the K applications displayed within the navigation area.

Accordingly, in the third manner, as for the first operable object in the first display mode and the object identifications of the applications provided within the navigation area in the second display mode, the two achieve the same functions, but have completely different display manners.

For example, as shown in FIG. 2, the multitask key B (corresponding to the first operable object) is provided within the navigation area of the graphic user interactive interface displayed with the first display mode based on the configuration parameters of the first display mode. As described above, if the user performs a trigger operation on the multitask key B, then the object identifications of the applications that are running in the electronic apparatus 1 are displayed (for example, the display interface of the applications that are running is displayed in a folded way or an overlapped way). Thereby, the user can enable the corresponding applications by further performing a trigger operation on the object identifications of the applications. In addition, it is also possible to enable the corresponding applications by performing a trigger operation on the object identifications (here, application icons) of applications provided within the non-navigation area in the first display mode.

Figure 3:
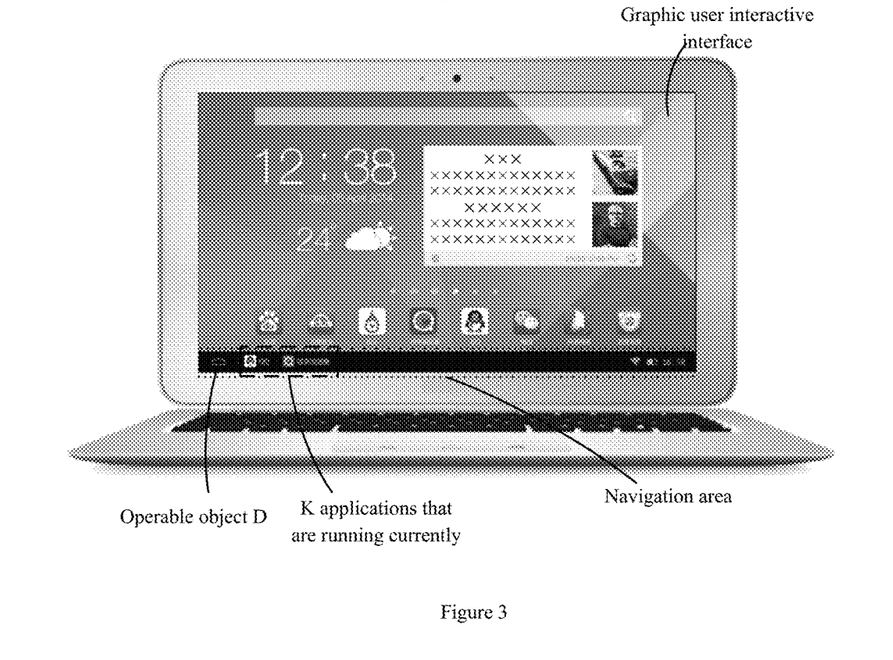
FIG. 3 is an exemplary diagram showing the graphic user interactive interface displayed with the second display mode.

On the other hand, object identifications of K applications that are running in the electronic apparatus are obtained by the control component 12 based on the configuration parameters of the second display mode and the K object identifications are displayed within the navigation area as operable objects. Description is provided with reference to FIG. 3. FIG. 3 is an exemplary diagram showing the graphic user interactive interface displayed with the second display mode. Icons of K applications that are running (corresponding to K object identifications) are displayed within the navigation area of FIG. 3, the function achieved therein is the same as that achieved by the multitask key B in the first display mode.

With the third manner, the functions of the operable objects in the first display mode can be retained in the second display mode, and the display manner is more adapted to perform input operation with the external input device, thereby the operating experience of the user can be further enhanced.

In a fourth manner, when the control component 12 controls the display component 11 to display the graphic user interactive interface with the second display mode, a second operable object and an operable interactive interface displayed by the second operable object in response to a trigger operation are obtained based on the configuration parameters of the second display mode, and the second operable object is displayed within the navigation area, the operable interactive interface including object identifications of L applications, which are applications that have already been installed in the electronic apparatus, L being a positive integer greater than or equal to one, the second operable object within the navigation area in the graphic user interactive interface as displayed based on the first display mode is used for returning to a specified graphic user interactive interface from any display interface in response to a trigger operation.

That is, in the first display mode, it is possible to return to a specified display interface (such as the main display interface) from any display interface by performing a trigger operation on the second operable object provided within the navigation area in the graphic user interactive interface. On the other hand, in the second display mode, it is possible to display an operable interactive interface by performing a trigger operation on the second operable object provided within the navigation area in the graphic user interactive interface, object identifications of L applications that have already been installed in the electronic apparatus are included in the operable interactive interface. If the user further performs a trigger operation on any of the object identifications of the L applications included in the operable interactive interface, the corresponding application can be initiated.

Accordingly, in the fourth manner, although the display manner of the second operable object in the first display mode and the second operable object in the second display mode are the same, but functions achieved by the two art completely different.

For example, as shown in FIG. 2, the primary key A (corresponding to the second operable object) is provided within the navigation area of the graphic user interactive interface displayed with the first display mode based on the configuration parameters of the first display mode. As described above, if the user performs a trigger operation on the primary key A, then it is possible to return to a specified display interface (which for example is the main display interface) from any display interface. On the other hand, the control component 12 obtains the operable object D (corresponding to the second operable object) as shown in FIG. 3 and the operable interactive interface displayed by the operable object D in response to the trigger operation based on the configuration parameters of the second display mode, and displays the operable object D within the navigation area, wherein the display manner of the operable object D in the second display mode is the same as that of the primary key A. In the second display mode, if the user performs a trigger operation on the operable object D, then an operable interactive interface including object identifications of L applications that have already been installed in the electronic apparatus 1 is displayed. In the case that the user further performs a trigger operation on any of the object identifications of the L applications included in the operable interactive interface, the corresponding application is initiated. Therefore, the function of the operable object D displayed in the second display mode is completely different from that of the primary key A.

With the fourth manner, the display manner of the operable object in the second display mode is the same as that of the operable object in the first display mode, therefore, the sense of discomfort brought by the change of the graphic user interactive interface to the user when the external input device is connected to the electronic apparatus 1 can be reduced, meanwhile the operating experience of the user can be enhanced.

In the above, the first to fourth manners are described as manners that make layout of operable objects within the navigation area in the graphic user interactive interface displayed with the first display mode and layout of operable objects within the navigation area in the graphic user interactive interface displayed with the second display mode are different. However, the present application is not limited thereto, the first to fourth manners as described above may also be combined arbitrarily. For example, in the exemplary diagram of the graphic user interactive interface displayed with the second display mode as shown in FIG. 3, a change of layout that combines the first, second, third, and fourth manners is performed on the operable objects (the primary key A, the multitask key B, and the return key C) provided within the navigation area of the graphic user interactive interface in FIG. 2. That is, the operable objects in FIG. 2 are shifted (displaying in the middle is changed into displaying leftwards) (the first manner), and the return key C is removed (the second manner), and the multitask B is changed into K icons of applications that are running (the third manner), and the primary key A is changed into the operable object D (the fourth manner).

Accordingly, the manners of changing layout within the navigation area are not limited to the above described four ones and their combinations, other manners may also be adopted (such as change the size of the object identifications, flashing display), and it is also possible to combine the other manners with the above four manners and their combinations, so long as the graphic user interactive interface displayed in the case where the external input device is connected with the electronic apparatus is adapted to that the user performs input operation with the external input device, and thereby the operating experience of the user can be enhanced.

In the above embodiments, the operable objects within the navigation area in the graphic user interactive interface are made different in a different display mode. However, the present application is not limited thereto, for example, when no navigation area is set within the graphic interactive interface, layout of arbitrary operation objects in the graphic user interactive interface is made different in a different display mode, so long as the operating experience of the user can be enhanced. In addition, in the case where the navigation area is set within the graphic user interactive interface, it is also possible to make the layout of the operable objects within the non-navigation area in the graphic user interactive interface different. As described above, here "layout is different" may be any of the first to fourth manners discussed above, and may also be a manner of combining the first to fourth manners discussed above.

In addition, the electronic apparatus 1 may further comprise an acceleration sensor 13, which is configured to detect acceleration of the electronic apparatus 1.

The control component 12 can change a position of the navigation area in the graphic user interactive interface based on the acceleration detected by the acceleration sensor 13.

Specifically, the control component 12 can control the position of the navigation area based on the detected acceleration, so that the navigation area is located on the side of the gravitational acceleration direction in the graphic user interactive interface. Thereby, in the case of a rollover of the electronic apparatus when the user is operating on the electronic apparatus 1, the position of the navigation area is changed as the side of the gravitational acceleration direction in the graphic user interactive interface, so that the position of the navigation area relative to the user maintains stable.

The control component 12 determines a position of the navigation area in the graphic user interactive interface based on parameters of the external input device 2 in the state where the external input device 2 is connected with the electronic apparatus 1. Specifically, when size of the external input device 2 is larger than a short side of the display component 11 and smaller than a long side of the display component 11, or size of the external input device 2 is larger than or equal to a long side of the display component 11, the navigation area in the graphic user interactive interface is fixed at a bottom of the graphic user interactive interface in a case where the display component 11 displays the graphic user interactive interface in a positive direction when connection between the electronic apparatus 1 and the external input device 2 is completed, the bottom corresponds to an edge of the electronic apparatus 1 that contacts the external device 2 due to the connection.

Alternatively, the control component 12 determines a position of the navigation area in the graphic user interactive interface based on types of the external input device 2 in the state where the external input device 2 is connected with the electronic apparatus 1, when the external input device is a keyboard input device or/and a touch input device, the navigation area in the graphic user interactive interface is fixed at a bottom of the graphic user interactive interface in a case where the display component 11 displays the graphic user interactive interface in a positive direction when connection between the electronic apparatus 1 and the external input device 2 is completed, the bottom corresponds to an edge of the electronic apparatus 1 that contacts the external device 2 due to the connection.

That is, during the period of displaying with the second display mode in the case where the external input device 2 is connected with the electronic apparatus 1, even if the acceleration sensor 13 detects a change of acceleration, the control component 12 still does not change the position of the navigation area in the graphic user interactive interface. Alternatively, during the period of displaying with the second display mode in the case where the external input device 2 is connected with the electronic apparatus 1, the acceleration sensor may be disabled.

Herein, in the case where the external input device 2 is connected with the electronic apparatus in a wired manner, the position of the navigation area is fixed in the graphic user interactive interface.

Accordingly, in the case where the external input device 2 is connected with the electronic apparatus 1, the navigation area is fixed at the bottom, so that it is quite adapted to that the user performs input operation with the external input device.

To sum up, in the electronic apparatus 1 according to an embodiment of the present application, layout of the operable objects in the graphic changes based on whether the external input device 2 is connected with the electronic apparatus 1, so that the graphic user interactive interface displayed in the case where the external input device 2 is connected with the electronic apparatus 1 is adapted to that the user performs input operation with the external input device, thereby the operating experience of the user can be enhanced.

Figure 4:
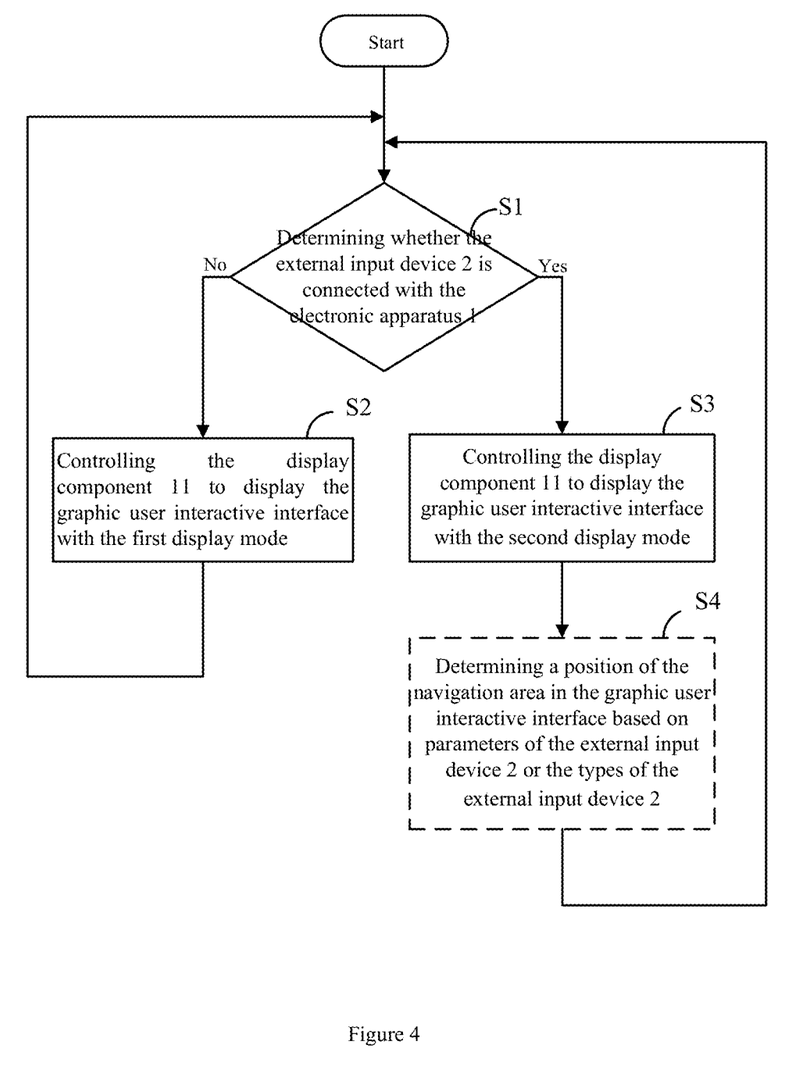
FIG. 4 is a flowchart showing a display control method of the electronic apparatus according to an embodiment of the present application.

Hereinafter, a display control method of the electronic apparatus according to an embodiment of the present application will be described with reference to FIG. 4. FIG. 4 is a flowchart showing a display control method of the electronic apparatus according to an embodiment of the present application.

The display control method according to the embodiment of the present application may be applied to the electronic apparatus as shown in FIG. 1. The electronic apparatus 1 is capable of being connected with an external input device 2 and comprises a display component 11 and a control component 12. As discussed above, the display component 11 is configured to display a graphic user interactive interface.

After the electronic apparatus 1 is powered and switched on, the display control method starts to proceed.

At step S1, the control component 12 determines whether the external input device 2 is connected with the electronic apparatus 1.

In a state where the external input device 2 is not connected with the electronic apparatus 1 ("No" at step S1), at step S2, the control component 12 controls the display component to display the graphic user interactive interface with a first display mode.

Specifically, the control component 12 displays operable objects that are for executing prescribed functions in response to a trigger operation of the user in the graphic user interactive interface based on the configuration parameters of the first display mode as described above.

A navigation area is set in the graphic user interface, and a plurality of operable objects that can execute prescribed functions in response to a trigger operation of the user are provided within the navigation area. For example, as shown in FIG. 2, a primary key A, a multitask key B, a return key C (i.e., operable objects) are provided in the navigation area. In addition, these operable objects may be also provided within the non-navigation area of the graphic user interactive interface, for example, operable objects like application icons etc. are provided within the non-navigation area as shown in FIG. 2, wherein the graphic user interactive interface displayed with the first display mode as shown in FIG. 2 is merely illustrative, numbers, locations, functions, and so on of the operable objects are not within the defining scope of the present application, any numbers, locations, and functions are allowed.

The control component 12 controls the display component 11 to display the graphic user interactive interface with a second display mode in a state where the external input device 2 is connected with the electronic apparatus 1 ("Yes" at step S1), wherein layout of operable objects in the graphic user interactive interface displayed with the first display mode and layout of operable objects in the graphic user interactive interface displayed with the second display mode are different.

In the display control method according to an embodiment of the present application, layout of the operable objects in the graphic changes based on whether the external input device is connected with the electronic apparatus, so that the graphic user interactive interface displayed in the case where the external input device is connected with the electronic apparatus is adapted to that the user performs input operation with the external input device, thereby the operating experience of the user can be enhanced.

In the case where a navigation area is set in the graphic user interactive interface, layout of operable objects within a navigation area in the graphic user interactive interface displayed with the first display mode and layout of operable objects within a navigation area in the graphic user interactive interface displayed with the second display mode are different.

By means of making layout of operable objects within the navigation area change while layout in the non-navigation area remains unchanged in the graphic user interactive interface, the sense of discomfort brought by the change of the graphic user interactive interface to the user when the external input device is connected to the electronic apparatus 1 can be reduced, meanwhile the operating experience of the user can be enhanced.

Specifically, in a first manner, when the control component 12 controls the display component 11 to display the graphic user interactive interface with the second display mode, X operable objects within the navigation area are displayed in a second area of the navigation area based on configuration parameters of the second display mode, X being a positive integer greater than or equal to one, a relative position of the second area of the navigation area relative to the display component is different from a relative position of a first area of the navigation area relative to the display component, the first area of the navigation area being a position where the X operable objects within the navigation area are displayed within the navigation area based on configuration parameters of the first display mode. That is, in the first manner, the control component 12 shifts, based on the configuration parameters of the second display mode, the X operable objects displayed within the navigation area based on the configuration parameters of the first display mode.

For example, the control component 12 displays leftwards (corresponding to the second area) the above three operable objects, the primary key A, the multitask key B, and the return key C that are displayed in the middle in FIG. 2 (corresponding to the first area) relative to the display component 11 based on the configuration parameters of the second display mode. That is to say, the three operable objects displayed with the second display mode are shifted relative to the three operable objects displayed with the first display mode.

Specifically, in a second manner, when the control component 12 controls the display component 11 to display the graphic user interactive interface with the second display mode, M operable objects are displayed within the navigation area based on the configuration parameters of the second display mode, M being a positive integer that satisfies 1≤M<N, N being the number of operable objects displayed within the navigation area as determined based on the configuration parameters of the first display mode, the M operable objects are part of the N operable objects which are for being displayed within the navigation area as determined based on the configuration parameters of the first display mode. That is, in the second manner, the control component 12 reduces, based on the configuration parameters of the second display mode, part of the operable objects among the X operable objects displayed based on the configuration parameters of the first display mode within the navigation area.

For example, based on the configuration parameters of the second display mode, the control component 12 deletes the multitask key B, the return key C among the three operable objects, the primary key A, the multitask key B, the return key C as displayed in FIG. 2, displays only the primary key A within the navigation area of the graphic user interactive interface.

By means of removing parts of the operable objects that are not in use or used less frequently when the external input device 2 is connected with the electronic apparatus 1 in the case where the graphic user interactive interface is displayed with the second display mode, the graphic user interactive interface can be made more concise, which facilitates the user performing input operation with the external input device 2.

Specifically, in a third manner, when the control component 12 controls the display component 11 to display the graphic user interactive interface with the second display mode, object identifications of K applications that are running in the electronic apparatus are obtained based on the configuration parameters of the second display mode and the K object identifications are displayed within the navigation area as operable objects, K being a positive integer greater than or equal to one, the object identifications of the K applications are used for invoking applications corresponding to the object identifications in response to a trigger operation. The aforesaid K applications are applications initiated by object identifications within the non-navigation area of the graphic user interactive interface displayed with the first display mode in response to a trigger operation. A first operable object within the navigation area of the graphic user interactive interface displayed based on the first display mode is used for displaying the object identifications of the K applications that are running in response to a trigger operation. That is, in the third manner, as for the first operable object in the first display mode and the object identifications of the applications provided within the navigation area in the second display mode, the two achieve the same functions, but have completely different display manners.

For example, in FIG. 2, if the user performs a trigger operation on the multitask key B, then the object identifications of the applications that are running in the electronic apparatus 1 are displayed (for example, the display interface of the applications that are running is displayed in a folded way or an overlapped way). Thereby, the user can enable the corresponding applications by further performing a trigger operation on the object identifications of the applications. On the other hand, object identifications of K applications that are running in the electronic apparatus are obtained by the control component 12 based on the configuration parameters of the second display mode, and the K object identifications (icons of K applications that are running) are displayed within the navigation area as operable objects, as shown in FIG. 3. Accordingly, the function of the multitask key as shown in FIG. 2 and that of the icons of the K applications that are running in FIG. 3 are the same, but their display manners are different.

With the third manner, the functions of the operable objects in the first display mode can be retained in the second display mode, and the display manner is more adapted to perform input operation with the external input device, thereby the operating experience of the user can be further enhanced.

Specifically, in a fourth manner, when the control component 12 controls the display component 11 to display the graphic user interactive interface with the second display mode, a second operable object and an operable interactive interface displayed by the second operable object in response to a trigger operation are obtained based on the configuration parameters of the second display mode, and the second operable object is displayed within the navigation area, the operable interactive interface including object identifications of L applications, which are applications that have already been installed in the electronic apparatus, L being a positive integer greater than or equal to one, the second operable object within the navigation area in the graphic user interactive interface as displayed based on the first display mode is used for returning to a specified graphic user interactive interface from any display interface in response to a trigger operation. That is, in the fourth manner, although the display manner of the second operable object in the first display mode and the second operable object in the second display mode are the same, but functions achieved by the two are completely different.

For example, in FIG. 2, if the user performs a trigger operation on the primary key A, then it is possible to return to a specified display interface (which for example is the main display interface) from any display interface. On the other hand, the control component 12 obtains the operable object D (corresponding to the second operable object) as shown in FIG. 3 and the operable interactive interface displayed by the operable object D in response to the trigger operation based on the configuration parameters of the second display mode, and displays the operable object D within the navigation area. In the second display mode, if the user performs a trigger operation on the operable object D, then an operable interactive interface including object identifications of L applications that have already been installed in the electronic apparatus 1 is displayed. In the case that the user further performs a trigger operation on any of the object identifications of the L applications included in the operable interactive interface, the corresponding application is initiated. Therefore, the display manner of the operable object D in FIG. 3 is the same as that of the primary key A, but the functions of the two are completely different.

With the fourth manner, the display manner of the operable object in the second display mode is the same as that of the operable object in the first display mode, therefore, the sense of discomfort brought by the change of the graphic user interactive interface to the user when the external input device is connected to the electronic apparatus 1 can be reduced, meanwhile the operating experience of the user can be enhanced.

In the above, the first to fourth manners are described as manners that make layout of operable objects within the navigation area in the graphic user interactive interface displayed with the first display mode and layout of operable objects within the navigation area in the graphic user interactive interface displayed with the second display mode are different. However, the present application is not limited thereto, the first to fourth manners as described above may also be combined arbitrarily.

Accordingly, the manners of changing layout within the navigation area are not limited to the above described four ones and their combinations, other manners may also be adopted (such as change the size of the object identifications, flashing display), and it is also possible to combine the other manners with the above four manners and their combinations, so long as the graphic user interactive interface displayed in the case where the external input device is connected with the electronic apparatus is adapted to that the user performs input operation with the external input device, and thereby the operating experience of the user can be enhanced.

In the above embodiments of the display control method, the operable objects within the navigation area in the graphic user interactive interface are made different in a different display mode. However, the present application is not limited thereto, for example, when no navigation area is set within the graphic interactive interface, layout of arbitrary operation objects in the graphic user interactive interface is made different in a different display mode, so long as the operating experience of the user can be enhanced. In addition, in the case where the navigation area is set within the graphic user interactive interface, it is also possible to make the layout of the operable objects within the non-navigation area in the graphic user interactive interface different.

In addition, the display control method according to an embodiment of the present application may further comprise step S4, wherein as shown in FIG. 1, the electronic apparatus 1 may further comprise an acceleration sensor 13, which is configured to detect acceleration of the electronic apparatus 1.

The control component 12 can change a position of the navigation area in the graphic user interactive interface based on the acceleration detected by the acceleration sensor 13. For example, the control component 12 can control the position of the navigation area based on the detected acceleration, so that the navigation area is located on the side of the gravitational acceleration direction in the graphic user interactive interface. Thereby, in the case of a rollover of the electronic apparatus when the user is operating on the electronic apparatus 1, the position of the navigation area is changed as the side of the gravitational acceleration direction in the graphic user interactive interface, so that the position of the navigation area relative to the user maintains stable.

At step S4, the control component 12 determines a position of the navigation area in the graphic user interactive interface based on parameters of the external input device 2 or the types of the external input device 2.

Specifically, when size of the external input device 2 is larger than a short side of the display component 11 and smaller than a long side of the display component 11, or size of the external input device 2 is larger than or equal to a long side of the display component 11, the navigation area in the graphic user interactive interface is fixed at a bottom of the graphic user interactive interface in a case where the display component 11 displays the graphic user interactive interface in a positive direction when connection between the electronic apparatus 1 and the external input device 2 is completed. Alternatively, when the external input device is a keyboard input device or/and a touch input device, the navigation area in the graphic user interactive interface is fixed at a bottom of the graphic user interactive interface in a case where the display component 11 displays the graphic user interactive interface in a positive direction when connection between the electronic apparatus 1 and the external input device 2 is completed, wherein the bottom corresponds to an edge of the electronic apparatus 1 that contacts the external device 2 due to the connection.

That is, during the period of displaying with the second display mode in the case where the external input device 2 is connected with the electronic apparatus 1, even if the acceleration sensor 13 detects a change of acceleration, the control component 12 still does not change the position of the navigation area in the graphic user interactive interface. Alternatively, during the period of displaying with the second display mode in the case where the external input device 2 is connected with the electronic apparatus 1, the acceleration sensor may be disabled.

Herein, in the case where the external input device 2 is connected with the electronic apparatus in a wired manner, the position of the navigation area is fixed in the graphic user interactive interface.

Accordingly, in the case where the external input device 2 is connected with the electronic apparatus 1, the navigation area is fixed at the bottom, so that it is quite adapted to that the user performs input operation with the external input device.

In addition, after the processing at step S2 ends, the display control method according to an embodiment of the present application returns, thus again executing the step of determining whether the external input device 2 is connected with the electronic apparatus 1 at step S1. Thereby, in the case where it is determined that the external input device 2 is connected with the electronic apparatus 1, a graphic user interactive interface displayed with the first display mode in the state where the external input device 2 is connected with the electronic apparatus 1 is switched to a graphic user interactive interface displayed with the second display mode in the state where the external input device 2 is not connected with the electronic apparatus 1.

To sum up, in the display control method according to an embodiment of the present application, layout of the operable objects in the graphic changes based on whether the external input device 2 is connected with the electronic apparatus 1, so that the graphic user interactive interface displayed in the case where the external input device 2 is connected with the electronic apparatus 1 is adapted to that the user performs input operation with the external input device, thereby the operating experience of the user can be enhanced.

As can be appreciated by a person of ordinary skill in the art, respective elements and steps described in combination with the exemplary embodiments disclosed herein can be implemented by electronic hardware, computer software, or a combine of the two. And software modules may be placed in computer storage medium in any form. To clearly illustrate the interchangeability of hardware and software, in the above description, the compositions and functions of respective examples have already been described generally in terms of functions. These functions are to be executed exactly by hardware manner or software manner depends upon the particular application of the technical solutions and design constraints. A person skilled in the art can use different methods to achieve the described functions with respect to each specific application, but such implementation should not be construed as going beyond the scope of the present invention.

Various embodiments of the present invention are described above in detail. However, it should be understood by a person skilled in the art that, various modifications, combinations or sub-combinations may be made to these embodiments without departing from the principles and spirits of the invention, and such amendments shall fall within the scope of the present invention.

The invention claimed is:

1. A display control method in an electronic apparatus that is capable of being connected with an external input device and includes a display component configured to display a graphic user interactive interface and includes an acceleration sensor, the display control method comprising:
   determining whether the external input device is connected with the electronic apparatus;
   controlling the display component to display a first graphic user interactive interface with a first display mode in a state where the external input device is not connected with the electronic apparatus; and
   controlling the display component to display a second graphic user interactive interface with a second display mode in a state where the external input device is connected with the electronic apparatus,
   wherein a layout of operable objects in the first graphic user interactive interface displayed with the first display mode and a layout of operable objects in the second graphic user interactive interface displayed with the second display mode are different, and in the state where the external input device is connected with the electronic apparatus, disabling the acceleration sensor and fixing a position of a second navigation area in the second graphic user interactive interface at a bottom of the second graphic user interactive interface which corresponds to an edge of the electronic apparatus that contacts the external input device due to a connection, between the external input device and the electronic apparatus, based on a type of the external input device, wherein, in the state where the external input device is not connected with the electronic apparatus, enabling the acceleration sensor, and a position of a first navigation area displayed in the first display mode is changed based on an acceleration detected by the acceleration sensor.

2. The display control method according to claim 1, wherein a layout of operable objects within the first navigation area in the first graphic user interactive interface displayed with the first display mode and a layout of operable objects within the second navigation area in the second graphic user interactive interface displayed with the second display mode are different.

3. The display control method according to claim 2, wherein the step of controlling the display component to display the second graphic user interactive interface with the second display mode comprises:
   displaying an X operable object or X operable objects within the second navigation area in a second area of the second navigation area based on configuration parameters of the second display mode, X being a positive integer greater than or equal to one, a relative position of the second area of the second navigation area relative to the display component being different from a relative position of a first area of the first navigation area relative to the display component, the first area of the first navigation area being a position where the X operable object or X operable objects within the first navigation area are displayed within the first navigation area based on configuration parameters of the first display mode; or displaying an M operable object or M operable objects within the second navigation area based on the configuration parameters of the second display mode, M being a positive integer that satisfies 1≤M<N, N being the number of operable objects displayed within the first navigation area as determined based on the configuration parameters of the first display mode, the M operable object or M operable objects being part of the N operable objects which are for being displayed within the first navigation area as determined based on the configuration parameters of the second display mode; or obtaining object identifications of a K application that is running in the electronic apparatus or object identifications of K applications that are running in the electronic apparatus based on the configuration parameters of the second display mode and displaying the K object identifications within the second navigation area as operable objects, K being a positive integer greater than or equal to one, the object identifications being used for invoking applications corresponding to the object identifications in response to a trigger operation, the K application or K applications being an application or applications initiated by object identifications within non-navigation area of the first graphic user interactive interface displayed based on the first display mode in response to a trigger operation, a first operable object within the first navigation area of the graphic user interactive interface displayed based on the first display mode is used for displaying the object identifications of the K application or K applications that is or are running in response to a trigger operation; or obtaining a second operable object and an operable interactive interface displayed by the second operable object in response to a trigger operation based on the configuration parameters of the second display mode, and displaying the second operable object within the second navigation area, the operable interactive interface including object identifications of an L application or object identifications of L applications, which is an application or are applications that have already been installed in the electronic apparatus, L being a positive integer greater than or equal to one, the second operable object within the first navigation area in the first graphic user interactive interface displayed based on the first display mode being used for returning to a specified display interface from any display interface in response to a trigger operation.

4. The display control method according to claim 2, wherein when the external input device is a keyboard input device or a touch input device, fixing the second navigation area in the second graphic user interactive interface at the bottom of the second graphic user interactive interface which corresponds to the edge of the electronic apparatus that contacts the external device due to the connection.

5. The display control method according to claim 2, wherein the step of controlling the display component to display the second graphic user interactive interface with the second display mode comprising a step of switching the first graphic user interactive interface displayed with the first display mode in the state where the external input device is not connected with the electronic apparatus to the second graphic user interactive interface displayed with the second display mode in the state where the external input device is connected with the electronic apparatus.

6. An electronic apparatus capable of being connected with an external input device, the electronic apparatus comprising:
a display component configured to display a graphic user interactive interface;
an acceleration sensor; and
a control component configured to determine whether the external input device is connected with the electronic apparatus, control the display component to display a first graphic user interactive interface with a first display mode in a state where the external input device is not connected with the electronic apparatus, and control the display component to display a second graphic user interactive interface with a second display mode in a state where the external input device is connected with the electronic apparatus,
wherein a layout of operable objects in the first graphic user interactive interface displayed with the first display mode and a layout of operable objects in the second graphic user interactive interface displayed with the second display mode are different, and in the state where the external input device is connected with the electronic apparatus, the control component disables the acceleration sensor and fixes a position of a second navigation area in the second graphic user interactive interface at a bottom of the second graphic user interactive interface which corresponds to an edge of the electronic apparatus that contacts the external input device due to a connection between the external input device and the electronic apparatus, based on a type of the external input device, and in the state where the external input device is not connected with the electronic apparatus, enabling the acceleration sensor, and a position of a first navigation area displayed in the first display mode is changed based on an acceleration detected by the acceleration sensor.

7. The electronic apparatus according to claim 6, wherein a layout of operable objects within a first navigation area in the first graphic user interactive interface displayed with the first display mode and a layout of operable objects within the second navigation area in the second graphic user interactive interface displayed with the second display mode are different.

8. The electronic apparatus according to claim 7, wherein when the control component controls the display component to display the second graphic user interactive interface with the second display mode,
an X operable object or X operable objects within the second navigation area is displayed in a second area of the second navigation area based on configuration parameters of the second display mode, X being a positive integer greater than or equal to one, a relative position of the second area of the second navigation area relative to the display component is different from a relative position of a first area of the first navigation area relative to the display component, the first area of the first navigation area being a position where the X operable object or X operable objects within the first navigation area are displayed within the first navigation area based on configuration parameters of the first display mode; or an M operable object or M operable objects is or are displayed within the second navigation area based on the configuration parameters of the second display mode, M being a positive integer that satisfies 1≤M<N, N being the number of operable objects displayed within the first navigation area as determined based on the configuration parameters of the first display mode, the M operable object or M operable objects is or are part of the N operable objects which are for being displayed within the first navigation area as determined based on the configuration parameters of the first display mode; or object identifications of a K application that is running in the electronic apparatus or object identifications of K applications that are running in the electronic apparatus are obtained based on the configuration parameters of the second display mode and the K object identifications are displayed within the second navigation area as operable objects, K being a positive integer greater than or equal to one, the object identifications are used for invoking applications corresponding to the object identifications in response to a trigger operation, the K application or K applications is an application or are applications initiated by object identifications within non-navigation area of the first graphic user interactive interface displayed based on the first display mode in response to a trigger operation, a first operable object within the first navigation area of the first graphic user interactive interface displayed based on the first display mode is used for displaying the object identifications of the K application or K applications that is or are running in response to a trigger operation; or a second operable object and an operable interactive interface displayed by the second operable object in response to a trigger operation are obtained based on the configuration parameters of the second display mode, and the second operable object is displayed within the second navigation area, the operable interactive interface including object identifications of an L application or object identifications of L applications, which is an application or are applications that has or have already been installed in the electronic apparatus, L being a positive integer greater than or equal to one, the second operable object within the first navigation area in the first graphic user interactive interface displayed based on the first display mode is used for returning to the second graphic user interactive interface from any display interface in response to a trigger operation.

9. The electronic apparatus according to claim 7, wherein when the external input device is a keyboard input device or a touch input device, the second navigation area in the second graphic user interactive interface is fixed at the bottom of the second graphic user interactive which corresponds to an edge of the electronic apparatus that contacts the external device due to the connection.

10. The electronic apparatus according to claim 7, wherein the control component controls the display component to display the second graphic user interactive interface with the second display mode by switching the first graphic user interactive interface displayed with the first display mode in the state where the external input device is not connected with the electronic apparatus to the second graphic user interactive interface displayed with the second display mode in the state where the external input device is connected with the electronic apparatus.

* * * * *